L. ZEMAN.
SUPPLEMENTAL TIRE.
APPLICATION FILED APR. 11, 1913.
1,108,653.   Patented Aug. 25, 1914.
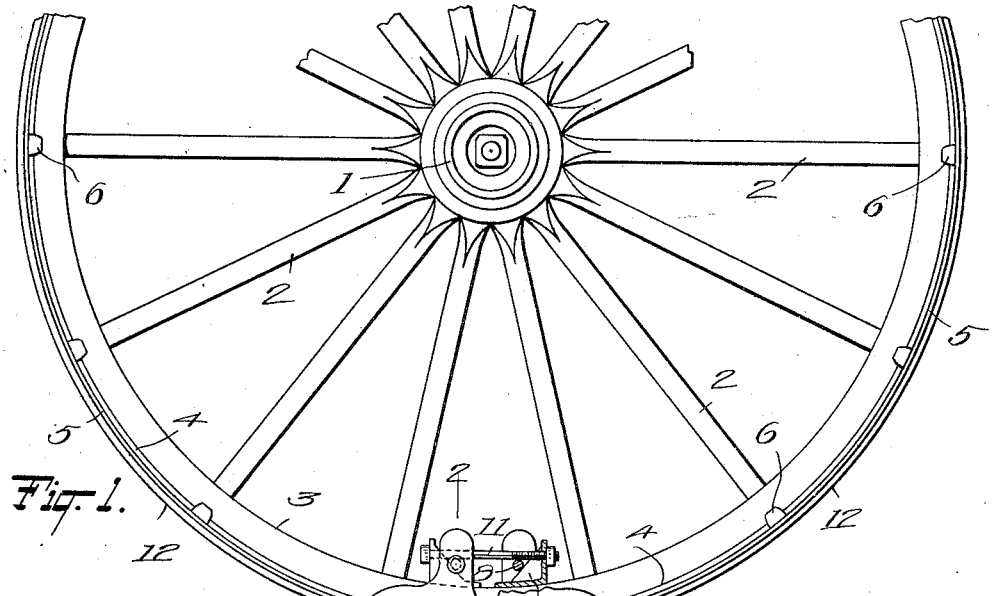
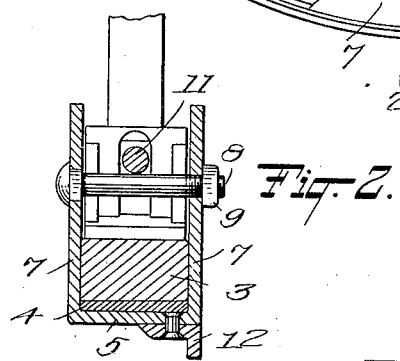
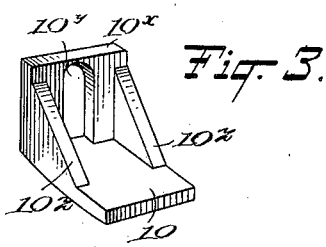
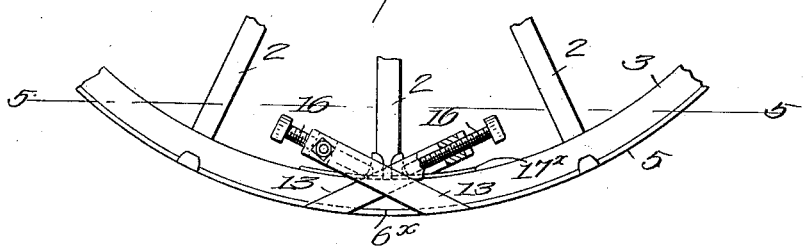
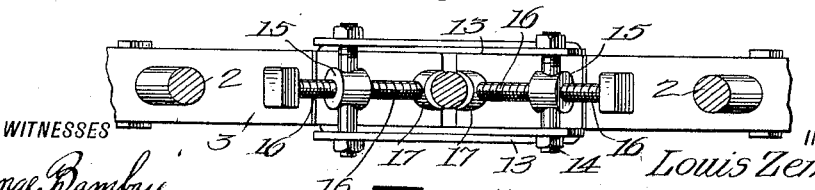
WITNESSES
George Bambay
L. H. Stanley
INVENTOR
Louis Zeman
BY Munn & Co
ATTORNEYS

UNITED STATES PATENT OFFICE.

LOUIS ZEMAN, OF TOBIAS, NEBRASKA.

SUPPLEMENTAL TIRE.

1,108,653.

Specification of Letters Patent. Patented Aug. 25, 1914.

Application filed April 11, 1913. Serial No. 760,415.

*To all whom it may concern:*

Be it known that I, LOUIS ZEMAN, a citizen of the United States, and a resident of Tobias, in the county of Saline and State of Nebraska, have made certain new and useful Improvements in Supplemental Tires, of which the following is a specification.

My invention relates to improvements in supplemental tires for wheels of wagons or other vehicles except such as run on rails or are equipped with pneumatic tires.

An object of the invention is to provide a supplemental tire which may be readily attached to or removed from the wheel and which is provided with a calk for preventing the skidding of the vehicle on slippery roads.

A further object of my invention is to provide a simple device of the type mentioned which may be firmly secured to the wheel by a novel form of tightening device.

Other objects and advantages will appear in the following specification and the novel features of the device will be particularly pointed out in the appended claim.

My invention is illustrated in the accompanying drawings forming part of this application in which—

Figure 1 is a side view of a portion of a wheel provided with an anti-skidding supplemental tire, Fig. 2 is an enlarged section on the line 2—2 of Fig. 1, Fig. 3 is a perspective view of one of the wedges, Fig. 4 is a view of a modified form of the tightening means, and Fig. 5 is a sectional view along the line 5—5 of Fig. 4.

The demountable anti-skid supplemental tire may be applied to an ordinary wagon wheel having a steel or iron tire. Such a wheel is shown in Fig. 1. In this figure 1 denotes the hub of the wheel, 2 the spokes, and 3 the felly. The metal tire is shown at 4.

The supplemental tire consists of a metal band 5 preferably made of hard iron or mild steel in circular form, the band being split as shown at 6 so as to permit it to be placed over the wheel. The band 5 is preferably provided with integral lugs 6 which are cut or stamped from the material of which the band is made, and are bent at right angles thereto so as to engage the side of the felly and tire in the manner shown in Fig. 1. The lugs 6 prevent the lateral displacement of the rim.

Adjacent to the split portion are integral flanges such as those shown at 7. These flanges have extensions arranged to receive bolts 8 which pass through the extensions on the opposite side and which are provided with nuts 9.

Disposed between the opposed flanges 7 are wedges of the shape shown in Fig. 3. These consist of a base portion 10, a laterally extending integral portion $10^x$ provided with an elongated slot $10^y$, and inclined side members $10^z$. A bolt 11 is arranged to extend through the slots of the opposed wedges as shown in Fig. 1.

Riveted or otherwise secured at one edge of the rim 5 is a calk 12 as shown in Fig. 2. In the present instance I have shown this calk as extending around the rim thus forming a circular continuous member, and being split at $6^x$, but it may be made in sections without departing from the spirit of the invention.

From the foregoing description of the various parts of the device the operation thereof may be readily understood.

In applying the supplemental tire it is slipped over the wheel the wedges are placed in the position shown in Fig. 1, and the bolt 11 is tightened, thus forcing the inclined surfaces $10^z$ of the wedges against the bolts 8, thereby drawing together the ends of the split tire. The rim is thus drawn close to the tire of the wheel so that there is no danger of the rim slipping around the wheel.

In Figs. 4 and 5 I have shown a modified form of tightening device. In this form the tire 5 is provided at its ends with integral arms or flanges 13, the flanges on one end of the split tire being arranged to pass between the flanges on the other end. Bolts 14 are provided which secure the ends of these arms or flanges 13 together. The bolts 14 are provided with central nuts 15 arranged to receive bolts 16. The ends of the latter bear upon plates 17 which are curved to fit around a spoke 2 and which have integral bearing plates $17^x$ arranged to bear on the inner side of the felly 3. As shown in Fig. 4 each plate 17 is slightly recessed so as to provide a socket for the end of the bolt 16. The rim 5 is secured to the wheel by tightening the bolts 16, thus drawing the ends of the tire together and firmly securing the tire to the periphery of the wheel.

I claim:

The combination with a wheel having a felly and a tire, of a supplemental tire, said supplemental tire comprising a split band arranged to engage the tire and having integral lugs extending on each side of said felly, integral flanges disposed at the ends of said split band, bolts for securing together the end flanges on opposite sides of the felly, wedges disposed between the end flanges and having inclined surfaces arranged to engage said bolts, and a tightening bolt for forcing said wedges together.

LOUIS ZEMAN.

Witnesses:
 ADAM BUCHER,
 CHARLES SLIGHT.